United States Patent [19]

Bratten

[11] Patent Number: 4,568,460

[45] Date of Patent: Feb. 4, 1986

[54] FILTER APPARATUS AND METHOD

[76] Inventor: Jack R. Bratten, 5970 St. James Dr., West Bloomfield, Mich. 48033

[21] Appl. No.: 679,746

[22] Filed: Dec. 10, 1984

Related U.S. Application Data

[63] Continuation of Ser. No. 577,042, Feb. 6, 1984, abandoned, which is a continuation-in-part of Ser. No. 405,524, Aug. 5, 1982, Pat. No. 4,430,231.

[51] Int. Cl.$^4$ ............................................. B01N 29/02
[52] U.S. Cl. .................................... 210/387; 210/401; 210/498
[58] Field of Search ............... 210/386, 387, 400, 401, 210/498

[56] References Cited

U.S. PATENT DOCUMENTS

| | | | |
|---|---|---|---|
| 2,813,632 | 11/1957 | Muller | 210/498 X |
| 3,899,426 | 8/1975 | Hins | 210/387 |
| 4,168,236 | 9/1979 | Bahr | 210/386 |
| 4,343,701 | 8/1982 | Parshall | 210/387 |
| 4,346,003 | 8/1982 | Polyakov et al. | 210/400 |
| 4,362,617 | 12/1982 | Klepper | 210/387 X |

Primary Examiner—John Adee
Attorney, Agent, or Firm—John R. Benefiel

[57] ABSTRACT

A liquid filter is disclosed including a filter chamber into which extends a looped endless belt which is passed above and below rollers on either side of the filter chamber. Both the upper and lower belt segments pass over a support plate in the filter chamber, the lower segment positioned directly underneath the upper belt segment. Filtering flow from the filter chamber passes through both belt segments and through spaced and tapered openings in the support plate and then into a collection trough beneath the support plate. The belt is periodically advanced to carry filter solids out of the filter chamber. In a first version, the upper belt segment acts as the filter media, and is wider to create a sealing of the lateral edges of the upper belt segment. In a second version, a disposable media lies atop both belt segments which act only to carry the disposable media and the disposable media is of wider width to establish the edge sealing. Spaced elongated bars are disposed within the collection trough supporting the bottom of the support plate with spaces between the trough rim and the bars, enabling flushing of the trough interior to remove accumulated fine solid particles. A plurality of filter units may be vertically stacked, with the collection trough of one unit forming the top of the next below filter unit.

9 Claims, 7 Drawing Figures

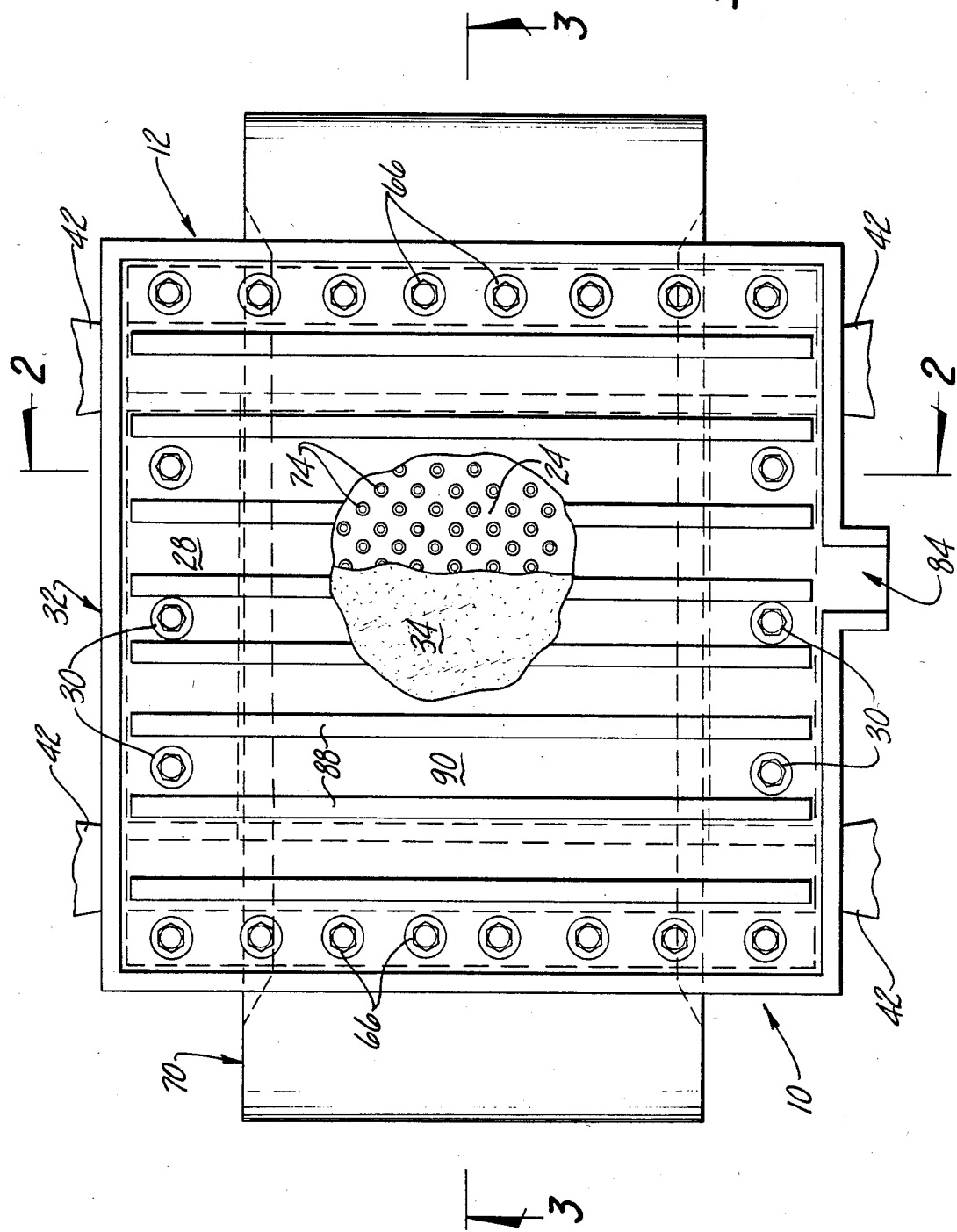

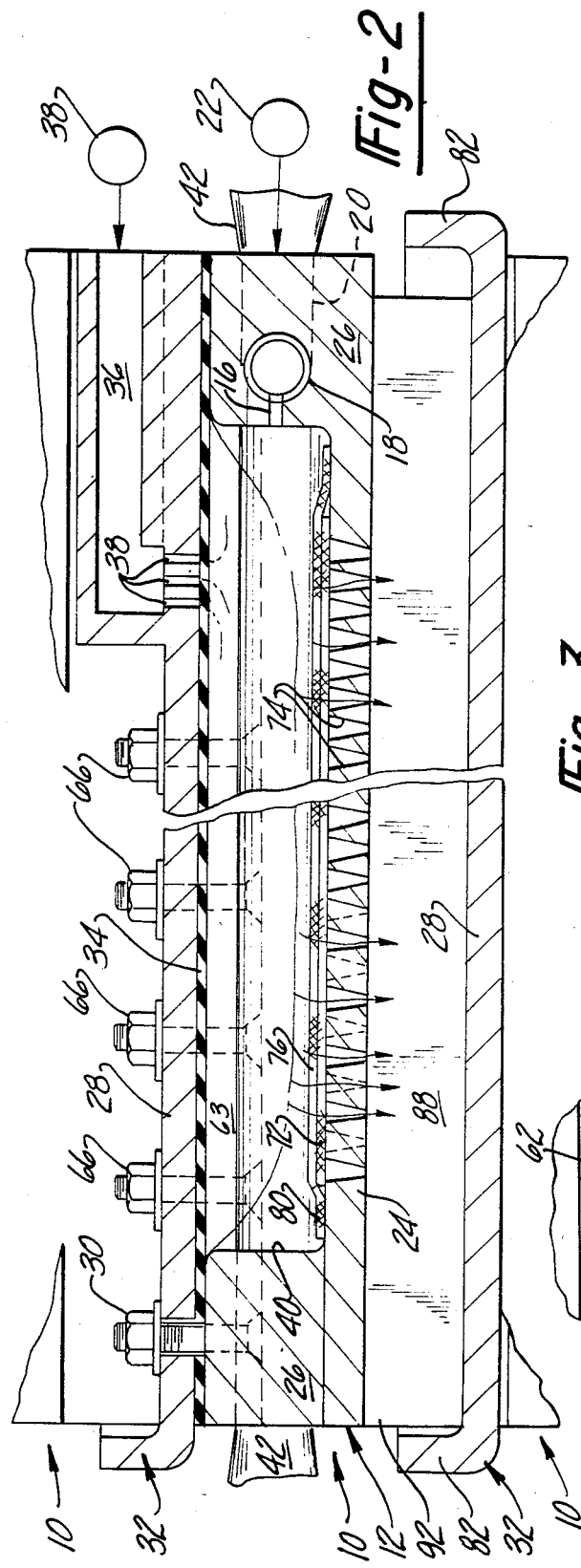
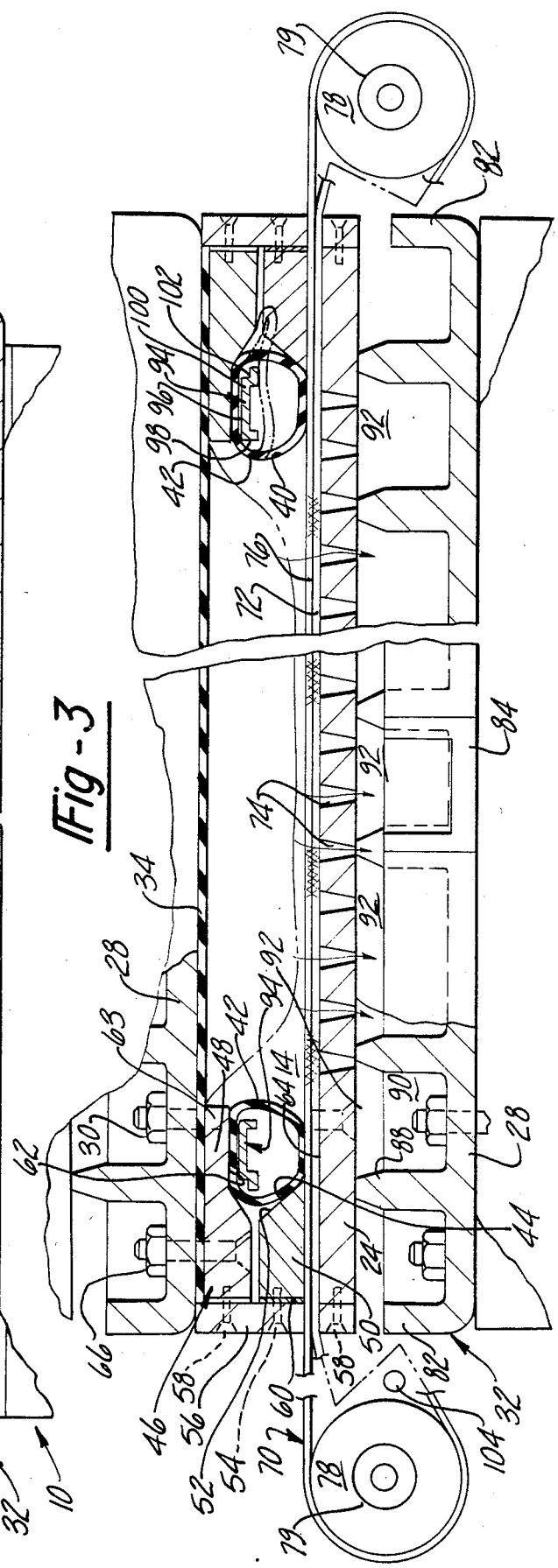

FILTER APPARATUS AND METHOD

CROSS-REFERENCE TO RELATED APPLICATION

This application is a continuation of application Ser. No. 577,042 filed 2/6/84 now abandoned which is a continuation-in-part of application Ser. No. 405,524, filed Aug. 5, 1982, now U.S. Pat. No. 4,430,231.

BACKGROUND DISCUSSION

This invention concerns filters and more particularly filters of the type adapted to remove suspended solids from liquids, such as for dewatering or desludging applications.

Such applications usually involve large volumes of liquid to be filtered, and large filtering areas are necessitated. Typically, pressurized flow is necessary to provide adequate flow rates, and a high degree of automation of the filter operations is highly desirable.

A known arrangement for conducting filtration for such applications is a vertically stacked pressurized chamber filter arrangement. A typical arrangement of this type is shown in U.S. Pat. No. 4,346,003. In this arrangement, a plurality of filter housings are mounted in a vertical array, with each filter housing defining a filter chamber which is pressurized with the liquid to be filtered. The filter flow passes through a filter media taking the form of an endless belt which has a segment passing into each filter chamber, and out around rollers and back into the next filter chamber, and so on, through the vertical array. Each filter consists of separable housing members which are simultaneously moved apart vertically to allow advancement of the belt segments from within the filter housing. This movement is necessary to remove the accumulated filtered solids and clean the belt as the filtration process proceeds.

The necessity for separating the filter housings requires a complex and very sturdy mechanism which must withstand the enormous forces involved with large area filtration under pressurized conditions.

In related application Ser. No. 405,524, filed Aug. 5, 1982, now U.S. Pat. No. 4,430,231, there is disclosed an arrangement for sealing openings into a filter housing by means of inflatable hose seals, such that the housing members may be permanently closed and only the inflatable sealing apparatus operated to enable the filter belt and accumulated solids to be periodically moved out of the filtering cavities and for disposal.

This arrangement eliminates the need for the complex mechanical appratus for opening and closing the housing components.

However, a relatively complex belt drive mechanism is required since each segment of the endless belt is passed into and out of each housing successively into a next succeeding housing in the vertical array. Thus, a very great length of filter belt is involved, and a complex roller and drive arrangement necessitated to advance all of the belt segments simultaneously.

An effective sealing of the filter belt edges in the arrangement described in the aforementioned patent application is more difficult since flow around and under the edges of the filter is more likely. Any build-up of sludge will of course necessitate disassembly of the unit for periodic clean out. This would be highly disadvantageous. In the separable housing-type filters, complete sealing of the belt lateral edges may be achieved by sealing engagement of the housing.

An alternative approach to the endless belt has involved the use of individual rolls of a disposable flexible sheet filter media, which are individually associated with each housing in the vertical array. Since the media is disposable, it need not be circulated back into a succeeding filter chamber, and may pass therethrough for collection and disposal on the opposite side of the housing chamber. However, the cost of such disposal media may become substantial for typical high volume applications of the sort described.

Additionally, the disposable media is typically of much lighter weight and is less easily driven through the housing, particularly when loaded with the accumulated filtered solids. If the media passes atop a perforated plate or grid, filtration pressure forces the disposable media into openings in the support plate, and a high pulling force is necessary. This has led to difficulties in reliably powering the movement of the filtering media out of the filtration chamber, in addition to incurring the cost of the filter media material.

Another problem has been encountered in such vertically stacked pressure filter units when filtering liquids containing very fine solids. A significant accumulation of very fine solids passing through the media may occur in the collection chambers associated with the filter unit. Accumulation of these solids in the collection chambers may necessitate dismantling and disassembling of the entire apparatus in order to clean out the accumulated fine solid materials.

A further problem has been encountered in pressurized chamber filters using a flexible sheet media. That is, the media must be supported on a plate which provides support for the filter media to resist the pressure differentials required for filtration.

The solid areas of the support plate reduces the area of the permeable filter media available for filtering flow since the media tends to be sealed against such solid areas. On the other hand, a reduction in the solid areas weakens the support plate, and at relatively higher pressures, the structural integrity of the support plate may be threatened.

Accordingly, it is an object of the present invention to provide a filter of the type including an endless belt member which passes into a filtration chamber, but which does not require a complex belt drive arrangement.

It is a further object of the present invention to provide such filters in which a plurality of units may be stacked in a vertical array to establish independently operated filter belt drive arrangements.

It is still a further object of the present invention to provide an edge sealing arrangement for the filter of the type described in which the belt passes into the interior of the filter chamber of a permanently assembled filter housing through selectively sealed openings.

It is yet another object of the present invention to provide an arrangement for collecting the filtered liquid flow which allows for clean-out of the collection space, without disassembly of the filter apparatus, particularly in a stacked vertical array of the filter units.

It is another object of the present invention to provide a support plate configuration which allows for maximum filtering flow area but which provides sufficient structural integrity to resist the stresses induced by high pressure differential filtration, yet which is relatively low in cost to manufacture.

SUMMARY OF THE INVENTION

The above-recited objects and others which shall become apparent upon a reading of the following specification and claims, are achieved by an arrangement including a looped endless belt member passing above and below exterior rollers on either side of a filter housing and with both upper and lower segments passing into a filter chamber through openings at either end of the filter housing, so as to overlie each other atop a support plate forming part of the filter chamber. Suitable support-drive rollers are positioned at either end and around which the endless belt is looped. The filter units may be stacked in a vertical array with independent drive arrangements for each filter unit.

In a first version, the upper segment of the endless belt acts as the filter media, which is of wider width than the underlying segment, to extend over adjacent solid areas of a supporting plate, which has openings formed in the region underlying both belt segments. The overhanging portion of the upper belt segment may optionally be treated to be impervious or be made of relatively impervious material, such as to enhance pressure sealing at lateral edges. This sealing precludes the formation of a sludge of filter solids and/or bypassing of flow underneath the belt segments.

In a second version, the belt segments do not act as filter media, but rather support a sheet layer of disposable filter media which also passes through the chamber positioned atop the belt segments and out of the filter chamber to the opposite side of the housing. The endless belt in this version accommodates liquid flow therethrough while providing sufficient stiffness to support the disposable media and tensile strength to enable it to carry the weight of the accumulated solids and filter media when moved out of the filter cavity for periodic cleaning.

In this second version, the disposable filter media is of wider width than either of the belt segments and extends outwardly over the solid areas of the support plate extending alongside the belt member through the filtered cavity. The filter media is likewise optionally treated with or otherwise made to be impervious to liquid flow in these regions to enhance the sealing engagement with the adjacent solid areas of the support plate.

Also, in the second version, the endless belt segments are preferably formed of a stiff, rather open material such as to allow the filtered liquid to freely flow therethrough.

The support plate is configured with tapered diameter through openings in the region underlying the elongated belt as it extends through the filter housing, the wider diameter of the openings immediately underneath the belt and the narrower diameter at the under surface of the support plate. This achieves a relatively strong support plate structure while maximizing the area available for flow through the filter belt and the disposable media in the latter described version.

The support plate is contemplated as being molded from a suitable high strength resin material to reduce the cost of fabrication and eliminate corrosion.

The support plate is underlain by a series of elongated bar members which extend across and engage the undersurface of the support plate to stiffen it against the pressures within the filtered chamber. The elongated bars in turn extend upwardly from the bottom of a collection trough having a rim of lower height than the elongated bars such that spaces are provided intermediate the trough and the elongated bars.

The collection trough is provided with an outlet and a slanting bottom facilitating periodic cleanouts of the collection trough. The openings intermediate the trough sides and the elongated support bar members allow a flushing spray into the trough interior to eliminate the need for disassembly of the filter unit to remove the accumulated fine solids for those applications where such accumulation would be significant.

The filter is preferably of the type as described in the aforementioned Ser. No. 405,524, now U.S. Pat. No. 4,430,231, in which inflatable hose seals extend across the oppositely located openings into the filter housing. The hose seals are inflated to seal and deflated to allow periodic movement of the belt and accumulated filtered solids out of the filter chamber.

The pressure filter also includes a dewatering diaphragm element bolted between housing members and the space therebetween pressurized to force the liquid from the filter chamber immediately prior to deflation of the hose seals and movement of the belt out of the filter chamber, as in the aforementioned U.S. Patent.

Similarly, the filter unit is preferably the type allowing a vertically stacked array. In this instance, the collection trough of each filter forms the top of the next below filtration unit housing with the elongated support bars being positioned against the undersurface of the next above succeeding support plate.

BRIEF DESCRIPTION OF THE DRAWINGS

FIG. 1 is a top view of the filter unit according to the present invention.

FIG. 2 is a view of the section 2—2 taken through the filter unit shown in FIG. 1, depicting fragmentary portions of adjacent filtering units in a vertically stacked array.

FIG. 3 is a fragmentary view of a section 3—3 taken through the filter unit shown in FIG. 1, depicting in diagrammatic form the endless belt and support and drive rollers.

DETAILED DESCRIPTION

Figure 4:
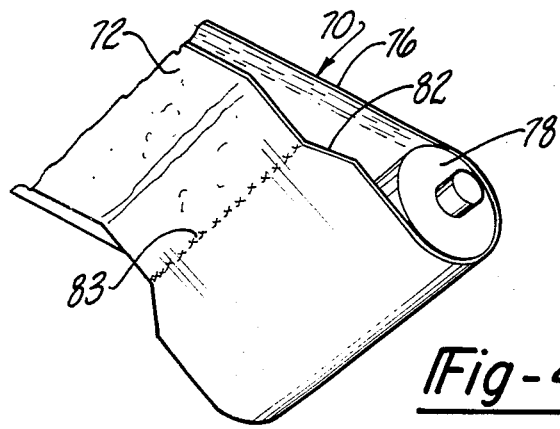
FIG. 4 is a perspective fragmentary view depicting the configuration of the endless belt and one of the support rollers.

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIGS. 1-3, the filter 10 according to the present invention is depicted, with adjacent filters 10 in a vertically stacked array, also depicted in fragmentary form. A suitable clamping arrangement including top and bottom pressure plates and tension posts (not shown) will clamp the top and bottom of the array together. Each filter 10 includes a housing 12 which defines therein a filtration chamber 14 (FIG. 3). Filtration chamber 14 receives liquid to be filtered through a series of side openings 16 drilled into a header tube 18. The header tube 18 is supplied with liquid to be filtered through one or more cross pipes 20 in return receiving liquid flow from a source, depicted diagrammatically at 22. The housing 12 is formed of top and bottom members bolted together including a support plate 24 forming the bottom of the chamber as viewed in FIG. 1 and having integral therewith a pair of side webs 26, shown molded integrally with the support plate 24 as shown in FIG. 1. A suitable high strength resin material may be used to eliminate corrosion by contact with the liquid to be filtered.

A top plate 28 overlies the side member portions 26 and is bolted thereto with a series of bolt and nut assemblies 30, as shown.

The top plate 28 forms a part of a collection trough member 32, as will be described later in detail.

Clamped between the top plate 28 and the side webs 26 is a distensible diaphragm 34, adjacent the undersurface of the top plate 28. The intermediate space is adapted to be pressurized with gas or liquid through an inlet passage 36, from a pressure source 38, through a plurality of openings 38 in communication with the interior of the passage 36. This produces a distention of the diaphragm 34 as shown in phantom to dewater the liquid remaining in the filtration chamber 14 prior to initiation of the removal of the filtered solids, as will be described hereinafter.

A pair of elongated openings 40 (FIG. 2) is thereby formed at either end of the housing 12. The openings 40 are adapted to be sealed during filtering, as in the above-referenced U.S. Patent, by segments of elastic hose members 42, which pass through side openings 44 and which are adapted to be pressurized to form a complete seal of the openings to prevent escape of the liquid due to pressurization of filter chamber 14 during filter operation.

As described in detail in the above-referenced U.S. Patent, each of the hose seals 42 pass through side openings 44 in the side webs 26 and the side openings are likewise sealed upon pressurization of the interior of the hose seals 42. An upper hose support member 46 extends across the upper region of the openings 40 and includes a lip portion 48 which supports the hose section across the side opening 44 to resist pressure forces from within the chamber 14. Hose support 46 is secured by bolt and nut assemblies 66.

Also provided is an adjustable block member 50 which also has a guide surface 52 which engages the hose seal 42 upon inflation to insure a smooth transition from the opening 44 to the configuration shown in section in FIG. 2.

Adjustable block member 50 is secured by means of screws 54 to a plate 56 adjacent either side of the front openings 40. Plate 56 is mounted as shown with screws 54. An adjustment of the inward extending of block member 50 is afforded by shims secured by screws 54, which control the engagement with the hose seal 42 to insure a smooth transition of the hose seals 42 to the side openings 44 without wrinkles.

The inflatable hose 42 accordingly seals against the interior surface 62 of the member 46, as well as against the interior of the side openings 44, as described in detail in the aforementioned U.S. Patent. Segments of an endless belt 70 to be described hereinafter are also compressed against surfaces 64 of the support plate 24 lying within openings 40 to complete the sealing of openings 40.

Portion 63 of each member 46 having the surface 62 formed thereon extends across the upper region of an opening 40 (FIG. 1) and a series of bolt and nut assemblies 66 clamp the member 46 against the diaphragm 34.

Passing into the filtration chamber 14 is the endless belt 70, looped to have a bottom segment 72 extending directly over the central region of the support plate, through which a plurality of tapered openings 74 are formed. The endless belt 70 also has an upper segment 76 which also extends through the filtration chamber 14, but lying atop the bottom segment 74, such as to be lapped over each other.

The endless belt 70 is looped around support drive rollers 78 located on either side of the housing 10 aligned with and opposite the openings 40.

Either or both of the support-drive rollers 78 are equipped with suitable drive means 79 to enable advancing motion of the drive belt 70 to cause upper segment 72 to be moved out of the housing periodically upon deflation of hose seals 42 for removal of accumulated filtered solids.

Filtering flow of the liquid in filter chamber 14 thus passes through both upper and lower segments 76, 72 of the endless belt 70. In order to produce effective edge sealing of the lapped belt segments 72 and 76, the upper segment 76 is made of wider width than the bottom segment 72, such that overhanging lateral edges 80 on either side extend beyond the bottom segment and onto an adjacent solid area of the support plate 24, not formed with through openings 74, but immediately adjacent that area in which the through openings 74 are formed. The overhanging areas 80 of belt segment 76 are preferably treated to be impervious to the flow of liquid, or are constructed of a differing material such as to enhance the sealing engagement upon pressurization of filtration chamber 14. This configuration of the looped endless belt 70 has been found to prevent significant flow of liquid to be filtered around and underneath endless belt 70, such as to prevent build-up of sludge or a substantial bypass of liquid flow through the filter.

The endless belt 70 in this embodiment itself acts as a filter media in carrying out the filtration process, and as such, the upper segment 76 is of proper porosity to achieve filtration in the particular application.

FIG. 4 shows a stepped area 82 in which the endless belt narrows down to the narrow width of the upper segment 72. Accordingly, the segment 72 and segment 76 may be of lengths of different woven materials sewn or otherwise joined together at 83, in which the upper segment 76 is of a tighter weave than the bottom segment 72 which may have wider openings to insure unimpeded flow after filtration has occurred by flow through the upper belt segment 76.

According to one aspect of the present invention, the filtered liquid, after passing through the tapered openings 74, passes into the unpressurized collection trough 32 from the top of an adjacent filter 10, located beneath the support plate 24. It has been found that the effective filter area may be increased by configuring the openings 74 to be tapered as shown in FIGS. 2 and 3, in which the larger diameter side is located immediately beneath the endless belt 70, and the smaller diameter side opening onto the undersurface of support plate 24. The increased material thickness at the bottom portion produced by the tapered hole construction strengthens the support plate 24 while the maximum filtration is afforded by the greater size of the upper end of openings 74. It has been found that the forcing of the filter media against the surface of the support plate 24 adjacent the openings by the pressurized liquid effectively greatly reduces flow through the filter media in the solid regions intermediate the openings. Accordingly, the tapered construction maintains a relatively great filter area while regaining some of the structural rigidity and strength of the support plate 24 by the increase in the material width at the underside of the support plate 24.

Since the flow is typically of relatively low volume, the tapered smaller diameter area of the opening 74 does not significantly restrict flow through the filter during filtration.

Preferably, the through openings 74 are staggered, row by row (FIG. 1), such as to maintain a constant web thickness between holes to make most efficient use of material.

The support plate 24 is preferably made by molding a high strength resin such as to minimize the cost of making a support plate with tapered openings 74, and at the same time, this affords resistance to corrosion from being in contact with water or other liquids. This also renders an integral construction of the side webs 26 of the bottom support plate 24 much simpler.

In this case, the header 18 may be cast in place together with one or more cross tubes 20 and the through openings 16 machined thereinto after the molding process is completed. The collection trough 32 receives outflow through the openings 74 at ambient atmospheric pressures.

Figure 5:
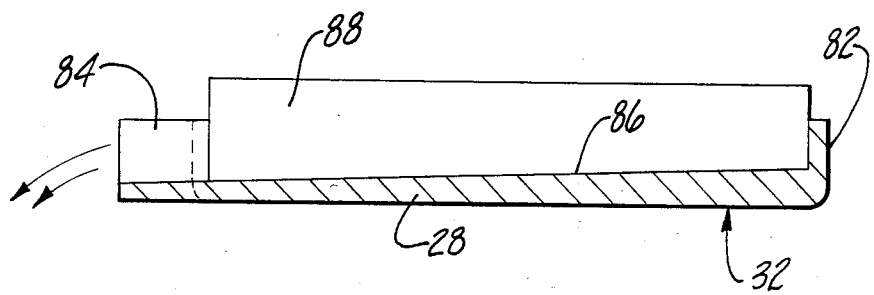
FIG. 5 is a sectional view through a collection trough member according to a modification of the filter shown in FIGS. 1-3.

The collection trough 32 includes upwardly extending sides forming a rim 82 so as to confine the liquid and direct it towards an outlet 84. As shown in FIG. 5, the plate 28 may have inside surface 86 of a varying thickness such as to create an internal slope, directing collected liquid towards the outlet 84.

Preferably molded integrally with the trough member 32 is a series of elongated support bars 88 which are in contact with the undersurface of the support plate 24 of the next above filter unit 10, such as to provide a stiffening support. Each of the elongated support members 88 extend parallel to each other and across the width of the filter unit as viewed in FIG. 1 with intervening spaces 90 therebetween.

The rim 82 of the collection trough is of lesser height such that gap openings 92 are formed between the elongated support members 88 and the rim 82 of the collection trough 32. The gaps 92 create open areas into which a flushing spray can be directed during maintenance of the filter to flush out any accumulated solids to the outlet 84, without requiring the disassembly of the filter 10 itself or the unclamping of the filters 10 in a vertical array. This arrangement is limited to those applications where an unpressurized collection of liquid is feasible.

Inflation and deflation of the hose seals 42, pressurizing of the space above diaphragm 34, pressurizing of chamber 14, are all controlled by a suitable control system, such as described in the aforementioned U.S. Patent, which is incorporated by reference for a description of a suitable control system. Such deflation of the hoses 42 is intended to collapse the hose seals 42 to create clearance through the openings 40. The hose seals 42 are also connected to fixturing and manifolding exterior to the filter for supporting the hoses and also directing and pressurizing gas or liquid into the interior thereof in order to accomplish the sealing function, all as described in detail in the aforementioned U.S. Pat. No. 4,430,231, which description is also herein incorporated by reference.

As described in that patent, an interior support bar 94 is provided to support the hose seals 42, extending across the openings 40 through openings 44, and into the supply fixturing. The interior support bar shown at 94 is preferably configured to enhance the flattening effect of the inflatable hose seal 42 to maximize the clearance space as shown in FIG. 2. The support bar 94 includes a flat bar section 96, an interior lip 98 and an exterior lip 100 which has a forward extension portion 102 affixed thereto.

As shown in phantom at the right side of FIG. 2, this shape produces an extension of the hose seal 42 to maximize the clearance space with the upper surface of the support plate 24 in the region below the hose seal 42 to thus insure free movement of the filtered solid material out of the filtration chamber 14 during the cycle of the apparatus during which the solids are removed preparatory to another filtration cycle.

A spray header shown diagrammatically at 104 may be provided or scraping or other apparatus for removal of the solids is also contemplated as being part of the present filter. Since the details of such apparatus do not form part of the present invention, and are well known to those skilled in the art, these are not illustrated in the interests of clarity.

Figure 6:
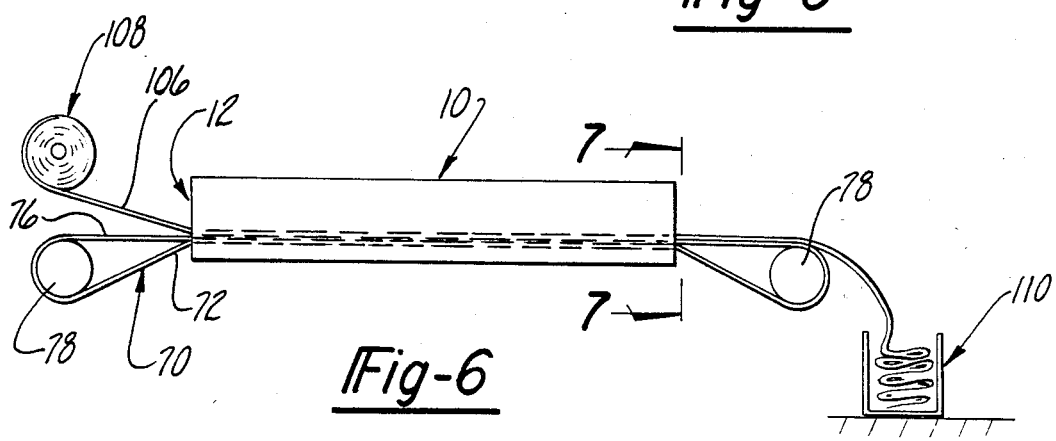
FIG. 6 is a diagrammatic view of an alternate embodiment of the filter unit according to the present invention.
Figure 7:
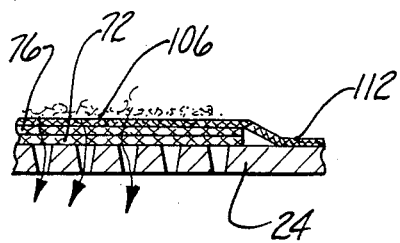
FIG. 7 is an enlarged fragmentary sectional view of the detail of the endless belt and disposable filter media relationship of the alternate embodiment shown in FIG. 6.

According to an alternate embodiment of the present invention shown in FIGS. 6 and 7, the endless belt 70 may provide only support for a disposable media 106 of porous sheet material which is fed off a supply roll 108 passed into the filter housing 12 atop the upper segment 76 of the endless belt 70, and carried therethrough passing out of the filter 10 at the other end and disposed in a collection container 110. In this arrangement, the endless belt 70 is of a relatively open weave of stiff material, since it would not perform any filtration function and would support the disposable filter media 106. The filter media 106 is relatively lightweight and flexible, and of proper porosity such as to carry out the filtration process.

In the embodiment shown in FIG. 7, each of the segments 76, 72 would be of the same width, and the disposable media 106 would be of wider width than either of segments 76, 72 extending thereover onto the solid areas of the support plate 24 adjacent the endless belt 70. This would enable a sealing action to be achieved by the overhanging edges 115 of the disposable sheet media 102. Again, preferably this portion thereof could be treated to be relatively impervious to the flow of filtered liquid, to enhance the sealing engagement with the upper surface of the support plate 24.

Accordingly, it can be appreciated that the above-recited objects of the present invention have been achieved by the filter arrangement described in that the noncirculating arrangement of the belt simplifies the drive arrangement considerably inasmuch as allowing independent motion in each of the endless filter belts. At the same time, an effective side sealing of the belt is achieved, notwithstanding the lapped, double thickness of the belt to insure that build-up of sludge between the layers does not result.

Further, the clean-out space in the depressurized version of the filter allows easy flushing to prevent build-up of solids in the collection chamber without necessitating the disassembly either of the filter units themselves or the filter units from the stacked array. The construction of the support plate is such as to be advantageous in the context of high pressure sealed chamber type filter units without compromising the effective filtration area by the tapered opening construction described.

Many variations are, of course, possible in the specific structures shown in the patent and the invention is not intended to be limited to the specific embodiments shown.

I claim:

1. A belt filter comprising:
a housing defining a filter chamber;
a support plate disposed in said chamber and having a portion formed with openings to allow liquid flow therethrough;
an endless belt of porous, flexible material and looped to have upper and lower segments both extending across said support plate, overlying each other in mutual contact atop said support plate, and extending out of said chamber on either side of said housing;
a pair of rollers located outside of and on either side of said housing, each roller receiving thereover one end of said looped endless belt;
means for periodically rotating at least one of said rollers to advance said belt segments on and off said support plate; and,
means for establishing a flow of liquid to be filtered from said chamber successively through both of said mutually contacting belt segments and said support plate during filtering flow of said liquid;
said support plate formed with solid portions extending alongside said portions formed with said openings, said solid portions overlain with said upper segment of said belt, said upper segment of said endless belt being wider than said lower segment of said belt to thereby establish a sealing engagement with said solid portions of said support plate.

2. The filter according to claim 1 wherein the portions of said upper segment of said endless belt extending over said solid portions of said support plate are substantially impervious to liquid flow to substantially enhance said sealing of said portions against said solid portions of said support plate.

3. The filter according to claim 1 wherein said filter housing defines a closed filter chamber having elongated openings on either side thereof through which either end of said endless belt segments extend, and further including sealing means located at said openings to periodically seal portions of said endless belt segments extending through said openings to enable pressurization of said filter chamber, and wherein said means for establishing said filtering flow includes means for directing liquid to be filtered into said filter chamber under pressure in a region located to cause flow of said liquid therefrom through said endless belt and thence through said openings in said support plate.

4. The filter according to claim 1 wherein said upper segment of said endless belt is formed of material with finer porosity than the porosity of said lower segment.

5. A filter comprising:
housing means defining a filter chamber;
means for directing liquid to be filtered under pressure into said chamber;
filtering means including a support plate forming a part of said housing and defining in part said chamber, said support plate having openings passing therethrough;
a layer of filter media comprising an elongated belt extending through said housing and over said support plate openings to receive flow of said liquid under pressure;
a plurality of elongated members extending beneath said support plate located to support said support plate against the force exerted by said pressurized liquid, said elongated members extending transversely to the length of said belt;
a collection trough extending beneath and supporting said elongated members and located to collect liquid passing out of said chamber through said filter media and support plate openings, said collection trough having an outlet to allow passage of said collected liquids out of said trough, said collection trough having an upwardly extending rim of height than said elongated members to thereby form openings to enable a flushing flow therethrough and between said elongated members.

6. The filter according to claim 5 wherein said collection trough is formed with a sloping bottom surface aligned with said elongated members to direct said liquid by gravity to said outlet.

7. A belt filter comprising:
a housing defining a filter chamber;
a support plate disposed in said chamber and having a portion formed with openings to allow liquid flow therethrough;
an endless belt of porous, flexible material and looped to have upper and lower segments both extending across said support plate, overlying each other in mutual contact atop said support plate, and extending out of said chamber on either side of said housing;
a pair of rollers located outside of and on either side of said housing, each roller receiving thereover one end of said looped endless belt;
means for periodically rotating at least one of said rollers to advance said belt segments on and off said support plate; and,
means for establishing a flow of liquid to be filtered from said chamber successively through both of said mutually contacting belt segments and said support plate during filtering flow of said liquid;
a sheet of disposable filter sheet media extending across said support plate and atop said endless belt, and means for periodically advancing a fresh segment of said sheet of disposable filter media onto said endless belt as said endless belt is advanced to carry off the previous segment of filter sheet media;
said support plate formed with solid portions alongside either side of said portion formed with said openings, said solid portions extending alongside said endless belt and wherein said disposable sheet media is wider than said endless belt and extends beyond said endless belt and over said solid portions to establish a seal therebetween;
said portions of said disposable filter sheet media extending over said solid portions of said support plate are impervious to filtering flow to enhance the sealing engagement therebetween;

8. A filter array formed by a series of vertically stacked filter units, each filter unit comprising:
a housing defining a filter chamber;
a support plate disposed in said chamber and having a portion formed with openings to allow liquid flow therethrough;
an endless belt of porous, flexible material and looped to have upper and lower segments both extending across said support plate, overlying each other in mutual contact atop said support plate, and extending out of said chamber on either side of said housing;
a pair of rollers, each roller located outside of and on either side of said housing, each roller receiving thereover one end of said looped endless belt;
means for periodically rotating at least one of said rollers to advance said belt segments on and off said support plate; and,
means for establishing a flow of liquid to be filtered from said chamber successively through both of said mutually contacting belt segments and said support plate during filtering flow of said liquid;
each of said housings secured together, with said endless belt of each filter unit in substantial vertical alignment.

9. A filter array formed by a series of vertically stacked filter units, each filter unit comprising:
housing means defining a filter chamber;
means for directing liquid to be filtered under pressure into said chamber;
filtering means including a support plate forming a part of said housing and defining in part said chamber, said support plate having openings passing therethrough;
a layer of filter media comprising an elongated belt extending through said housing and over said support plate openings to receive flow of said liquid under pressure;
a plurality of elongated members extending beneath said support plate located to support said plate against the force exerted by said pressurized liquid, said elongated members extending transversely to the length of said belt;
a collection trough extending beneath and supporting said elongated members and located to collect liquid passing out of said chamber through said filter media and support plate openings, said collection trough having an outlet to allow passage of said collected liquids out of said trough, said collection trough having an upwardly extending rim of lesser height than said elongated members to thereby form openings to enable a flushing flow therethrough and between said elongated members;
each of said filter units stacked atop each other with said collection trough of each filter forming the top of the next succeeding filter, and means securing said filter unit housing together in said vertically stacked series.

* * * * *

UNITED STATES PATENT AND TRADEMARK OFFICE
CERTIFICATE OF CORRECTION

PATENT NO. : 4,568,460
DATED : February 4, 1986
INVENTOR(S) : Jack R. Bratten

It is certified that error appears in the above–identified patent and that said Letters Patent are hereby corrected as shown below:

Claim 5, Column 10, line 22, "of height" should be --of lesser height--.

Signed and Sealed this

Sixth Day of May 1986

[SEAL]

Attest:

DONALD J. QUIGG

Attesting Officer

Commissioner of Patents and Trademarks